United States Patent
Oh et al.

(10) Patent No.: US 12,359,691 B2
(45) Date of Patent: Jul. 15, 2025

(54) AIR FOIL BEARING AND COMPRESSOR INCLUDING THE SAME

(71) Applicants: Hyundai Motor Company, Seoul (KR); Kia Corporation, Seoul (KR)

(72) Inventors: Byung Hwa Oh, Yongin-si (KR); Tae Young Kim, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 128 days.

(21) Appl. No.: 17/984,555

(22) Filed: Nov. 10, 2022

(65) Prior Publication Data
US 2023/0417278 A1    Dec. 28, 2023

(30) Foreign Application Priority Data
Jun. 22, 2022    (KR) .................... 10-2022-0076417

(51) Int. Cl.
*F16C 17/04*    (2006.01)

(52) U.S. Cl.
CPC ........ *F16C 17/042* (2013.01); *F16C 2360/24* (2013.01)

(58) Field of Classification Search
CPC ... F16C 17/042; F16C 2360/24; F04D 29/057
See application file for complete search history.

(56) References Cited

U.S. PATENT DOCUMENTS

| | | | |
|---|---|---|---|
| 4,820,761 A | 4/1989 | Saito et al. | |
| 5,248,205 A | 9/1993 | Gu et al. | |
| 6,158,892 A | 12/2000 | Stewart et al. | |
| 10,415,634 B2 | 9/2019 | Park et al. | |
| 10,557,497 B1 | 2/2020 | Jones | |
| 10,941,807 B2 | 3/2021 | Park et al. | |
| 2004/0096130 A1 | 5/2004 | Saville et al. | |
| 2005/0271311 A1 | 12/2005 | Saville et al. | |
| 2016/0195128 A1 | 7/2016 | Omori | |
| 2017/0191522 A1 | 7/2017 | Kim | |
| 2018/0291950 A1 | 10/2018 | Park et al. | |
| 2020/0011373 A1 | 1/2020 | Park et al. | |
| 2021/0324908 A1* | 10/2021 | LaTray | F16C 17/042 |
| 2021/0341013 A1* | 11/2021 | Omori | F16C 17/042 |

FOREIGN PATENT DOCUMENTS

| | | | |
|---|---|---|---|
| CN | 1563732 A | | 1/2005 |
| CN | 103047281 A | * | 4/2013 |
| CN | 111120503 A | | 5/2020 |
| CN | 111637151 A | | 9/2020 |
| JP | S60-023448 A | | 2/1985 |

(Continued)

OTHER PUBLICATIONS

Machine Translation of CN-103047281-A (Year: 2013).*

(Continued)

*Primary Examiner* — Alan B Waits
(74) *Attorney, Agent, or Firm* — Fish & Richardson P.C.

(57) ABSTRACT

An air foil bearing includes a bearing plate having a plate shape and a material layer coupled and fixed to the bearing plate and made of a different material from the bearing plate. A viscoelasticity of the material layer is greater than a viscoelasticity of the bearing plate. A compressor includes an air foil bearing.

14 Claims, 9 Drawing Sheets

(56) References Cited

FOREIGN PATENT DOCUMENTS

| | | |
|---|---|---|
| JP | S 60172721 A | 9/1985 |
| JP | S61-116789 A | 6/1986 |
| JP | S61-140217 U | 8/1986 |
| JP | S63-024422 U | 2/1988 |
| JP | 2016-075324 A | 5/2016 |
| JP | 2018-519483 A | 7/2018 |
| JP | 2019-015322 A | 1/2019 |
| KR | 20010063914 A | 7/2001 |
| KR | 10-0590139 B1 | 6/2006 |
| KR | 10-2012-0063111 A | 6/2012 |
| KR | 10-1408672 B1 | 6/2014 |
| KR | 10-2017-0116417 A | 10/2017 |
| KR | 20190086878 A | 7/2019 |
| KR | 20220035715 A | 3/2022 |
| WO | WO 2019-189987 A1 | 10/2019 |

OTHER PUBLICATIONS

Office Action in Chinese Appl. No. 202110275129.3, mailed on Apr. 11, 2025, 20 pages (with English translation).
Office Action in German Patent Application 10 2021 105 879.1, mailed on Apr. 22, 2025, 7 pages (with English translation).

* cited by examiner

AIR FOIL BEARING AND COMPRESSOR INCLUDING THE SAME

CROSS-REFERENCE TO RELATED APPLICATION(S)

This application claims priority from and the benefit of Korean Patent Application No. 10-2022-0076417, filed on Jun. 22, 2022, which is hereby incorporated by reference for all purposes as if set forth herein.

TECHNICAL FIELD

The present application relates to an air foil bearing having a novel structure and a compressor including the air foil bearing.

BACKGROUND

Bearings are components for supporting rotary bodies to allow rotary bodies to continuously rotate, and there are various types of bearings such as ball bearings, journal bearings, and air foil bearings. Among these bearings, the air foil bearing includes a base plate, a bump foil, and a top foil. An air film is formed between a rotary body and the air foil bearing by the rotation of the rotary body, thus making it possible to not only support the rotary body but also cool the rotary body. The air foil bearings are used in various industrial sites. For example, the air foil bearings may be used in compressors for providing compressed air to fuel cells.

More specifically, according to the related art, when the pressure around the air foil bearing changes due to the air flow produced by the rotation of the rotary body, the top foil presses the bump foil, and accordingly, the shape of the pressed bump foil changes. Then, when the rotary body stops rotating, the bump foil returns to its original shape. That is, according to the related art, the bump foil has an elastic structure of which shape is reversibly changed according to an external force.

In some cases, the bump foil has, for example, an embossed structure with an uneven surface. This structure of the bump foil for forming the elastic structure has acted as a factor to increase the time to manufacture the air foil bearing.

In some cases, the air foil bearing includes a top foil, a bump foil, and a base plate, and thus, it is necessary to control the qualities of all three components during the manufacturing process of the air foil bearing. Therefore, according to the related art, there were also difficulties in terms of the control of the components that constitute the air foil bearing.

In some cases, a method for manufacturing an air foil bearing having a simple form, from which the bump foil having the embossed structure is removed, may be considered. However, in some cases, a plate, which constitutes the air foil bearing, may generate vibration and noise due to disturbance in the environment in which the air foil bearing is used.

SUMMARY

Exemplary implementations of the present disclosure provide an air foil bearing, which reduces vibration and noise caused by disturbance while having a simpler structure than in the related art, and equipment to which the air foil bearing is mounted.

According to one aspect of the subject matter described in this application, an air foil bearing includes a bearing plate having a plate shape and a material layer coupled and fixed to the bearing plate and made of a different material from the bearing plate, where the viscoelasticity of the material layer is greater than the viscoelasticity of the bearing plate.

Implementations according to this aspect can include one or more of the following features. For example, the material layer may be in close contact with and fixed to the lower surface of the bearing plate.

In some implementations, an outer circumference of the bearing plate may have the shape of a circle. The bearing plate can include a circumferential region that forms the circumference of the bearing plate and extends in a circumferential direction (A) of the circle; a separate region that is spaced inward from the circumferential region in a radial direction (R) of the circle; and a connection region configured to connect the circumferential region to the separate region.

The width of the separate region in the circumferential direction (A) may be greater than the width of the connection region in the circumferential direction (A).

The material layer may be in close contact with and fixed to the lower surface of the separate region, and may be spaced apart from the lower surface of the circumferential region in the radial direction (R).

The air foil bearing may further include a lower reinforcing member that is in close contact with and fixed to the lower surface of the material layer.

The bearing plate may further include a stepped portion that is formed on the upper surface of the bearing plate and has a stepped shape, wherein the thickness of the bearing plate is changed at the stepped portion.

The stepped portion may be formed in the separate region.

The thickness of a portion of the separate region, which is spaced apart from the connection region on the basis of the stepped portion, may be less than the thickness of a portion of the separate region, which is adjacent to the connection region on the basis of the stepped portion.

The stepped portion may include a first stepped portion that extends in a direction crossing the circumferential direction (A).

The stepped portion may further include a second stepped portion that extends from an outer end of the first stepped portion which is located outside in the radial direction (R), where the second stepped portion extends in a direction crossing the radial direction (R).

The stepped portion may further include a third stepped portion that extends from an inner end of the first stepped portion which is located inside in the radial direction (R), where the third stepped portion extends in a direction crossing the radial direction (R).

The first stepped portion may connect one of both ends of the second stepped portion in the circumferential direction (A), which is adjacent to the connection region, to one of both ends of the third stepped portion in the circumferential direction (A), which is adjacent to the connection region.

The stepped portion may include: a protrusion section that protrudes toward the connection region; and a recess section which is connected to one end of the protrusion section and recessed in a direction away from the connection region.

The protrusion section and the recess section may be spaced apart from each other in the radial direction (R).

The protrusion section may include: a first protrusion section connected to an outer end of the recessed section which is located outside in the radial direction (R); and a second protrusion section connected to an inner end of the recessed section which is located inside in the radial direction (R), where the width of the first protrusion section in the circumferential direction (A) is greater than the width of the second protrusion section in the circumferential direction (A).

The distance between the first protrusion section and the connection region may be less than the distance between the second protrusion section and the connection region.

The bearing plate and the lower reinforcing member may include stainless steel, and the material layer may include epoxy resin.

According to another aspect, a compressor includes a housing and an air foil bearing fixed to one surface of the housing. The air foil bearing includes a bearing plate having a plate shape and a material layer coupled and fixed to the bearing plate and made of a different material from the bearing plate, where the viscoelasticity of the material layer is greater than the viscoelasticity of the bearing plate. The bearing plate includes a fixed end region that is fixed to the housing and a free end region that is spaced apart from the housing and moves relative to the housing.

The outer circumference of the bearing plate may have the shape of a circle, where the bearing plate includes a circumferential region that forms the circumference of the bearing plate and extends in a circumferential direction (A) of the circle; a separate region that is spaced inward from the circumferential region in a radial direction (R) of the circle, and a connection region configured to connect the circumferential region to the separate region. The circumferential region is the fixed end region, and the separate region is the free end region.

BRIEF DESCRIPTION OF THE DRAWINGS

The accompanying drawings, which are included to provide a further understanding of the disclosure and are incorporated in and constitute a part of this specification, illustrate implementations of the disclosure, and together with the description serve to explain the principles of the disclosure.

DETAILED DESCRIPTION

Hereinafter, an air foil bearing and a compressor including the air foil bearing will be described with reference to the drawings.

Figure 1:
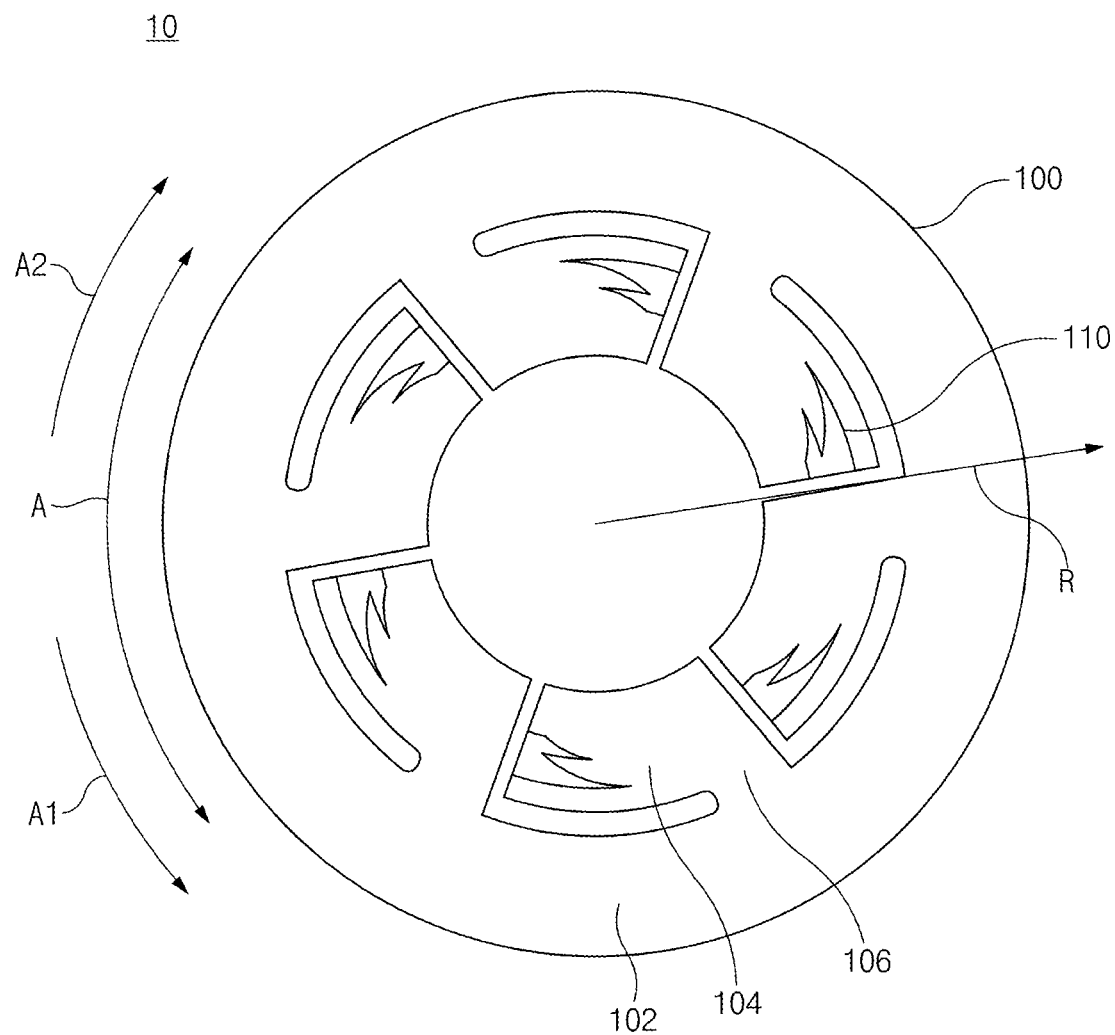
FIG. 1 is a plan view illustrating an example of an air foil bearing.
Figure 2:
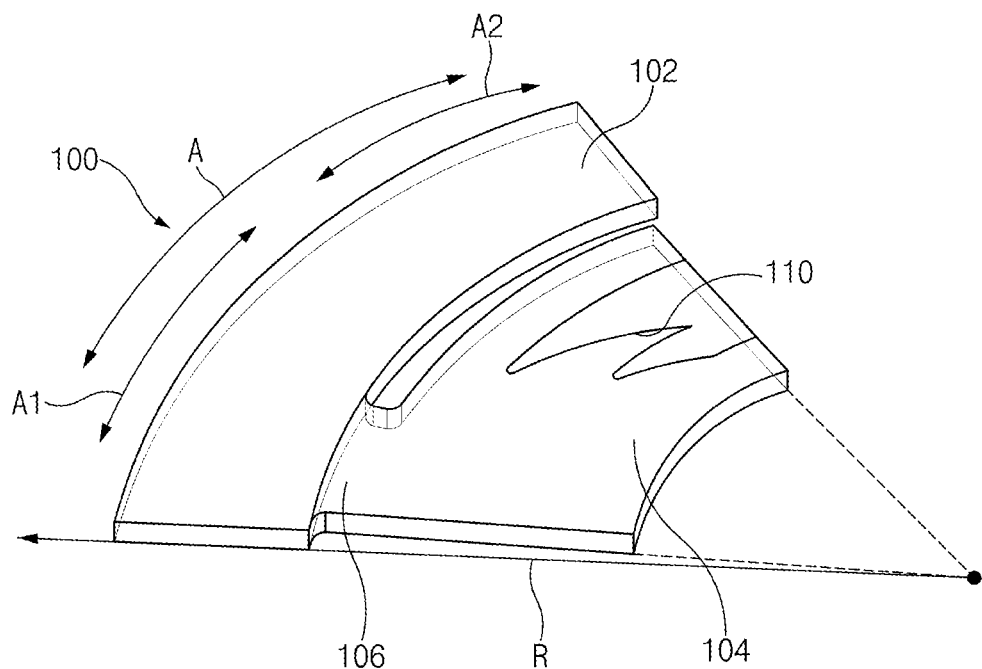
FIG. 2 is an enlarged view illustrating one of a plurality of separate regions and a peripheral region thereof which are provided in the air foil bearing.
Figure 3:
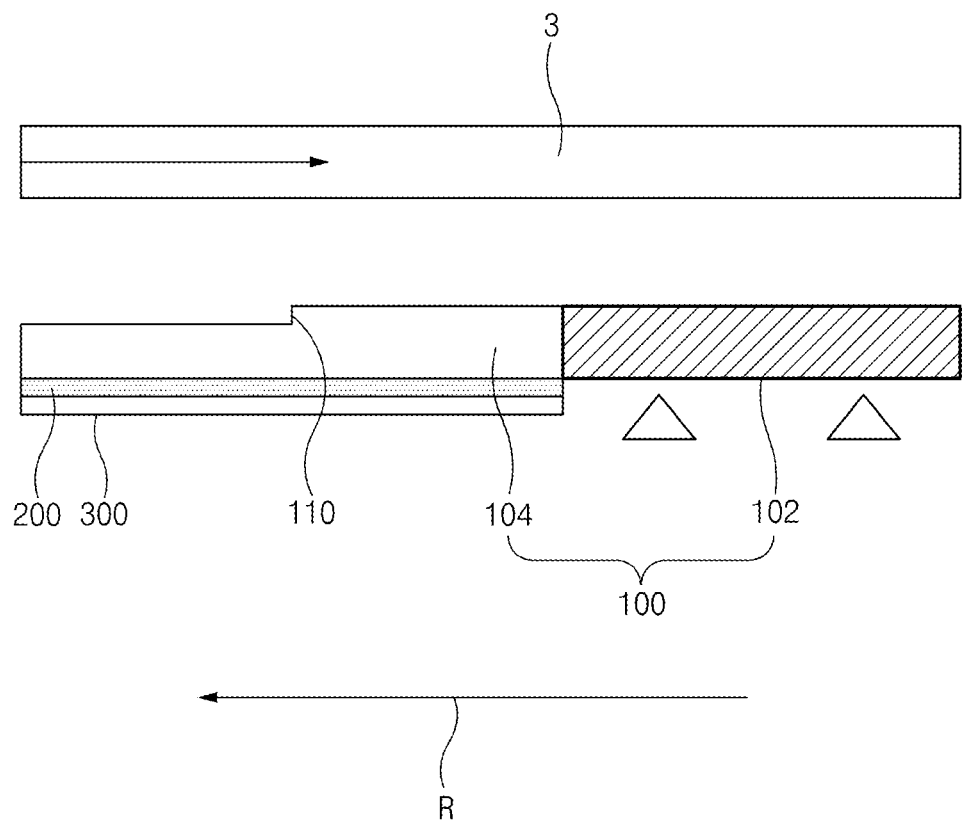
FIG. 3 is a cross-sectional view illustrating a state before the air foil bearing is deformed.
Figure 4:
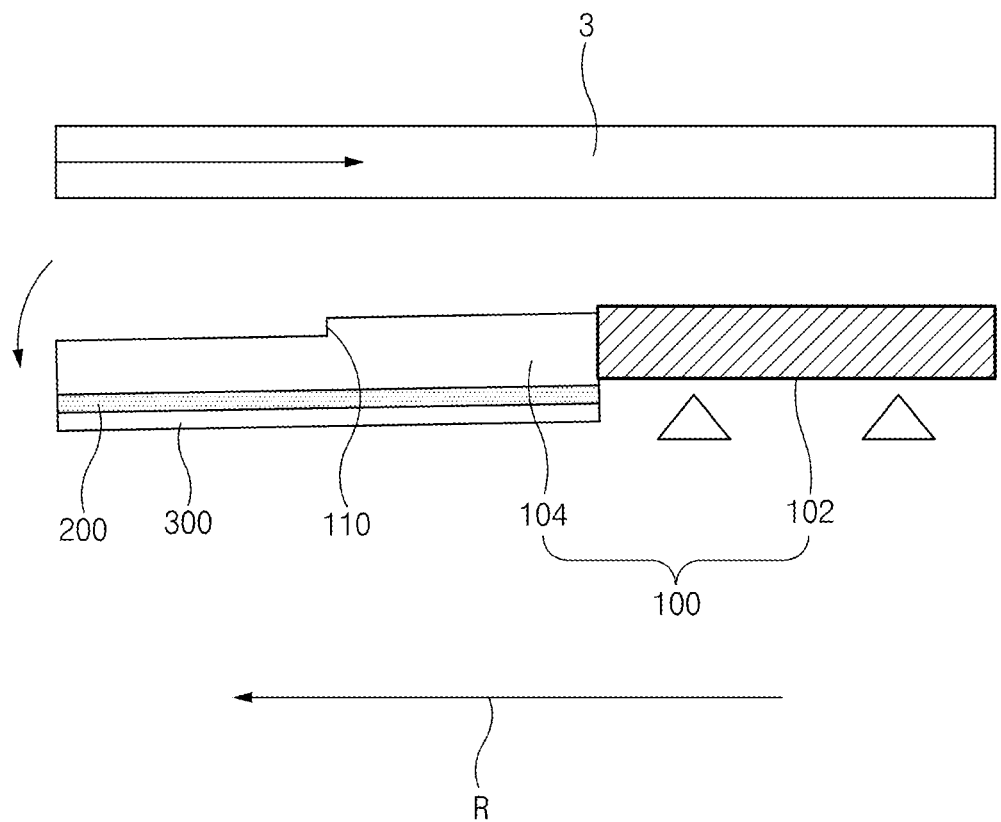
FIG. 4 is a cross-sectional view illustrating a state in which the air foil bearing has been deformed.
Figure 5:
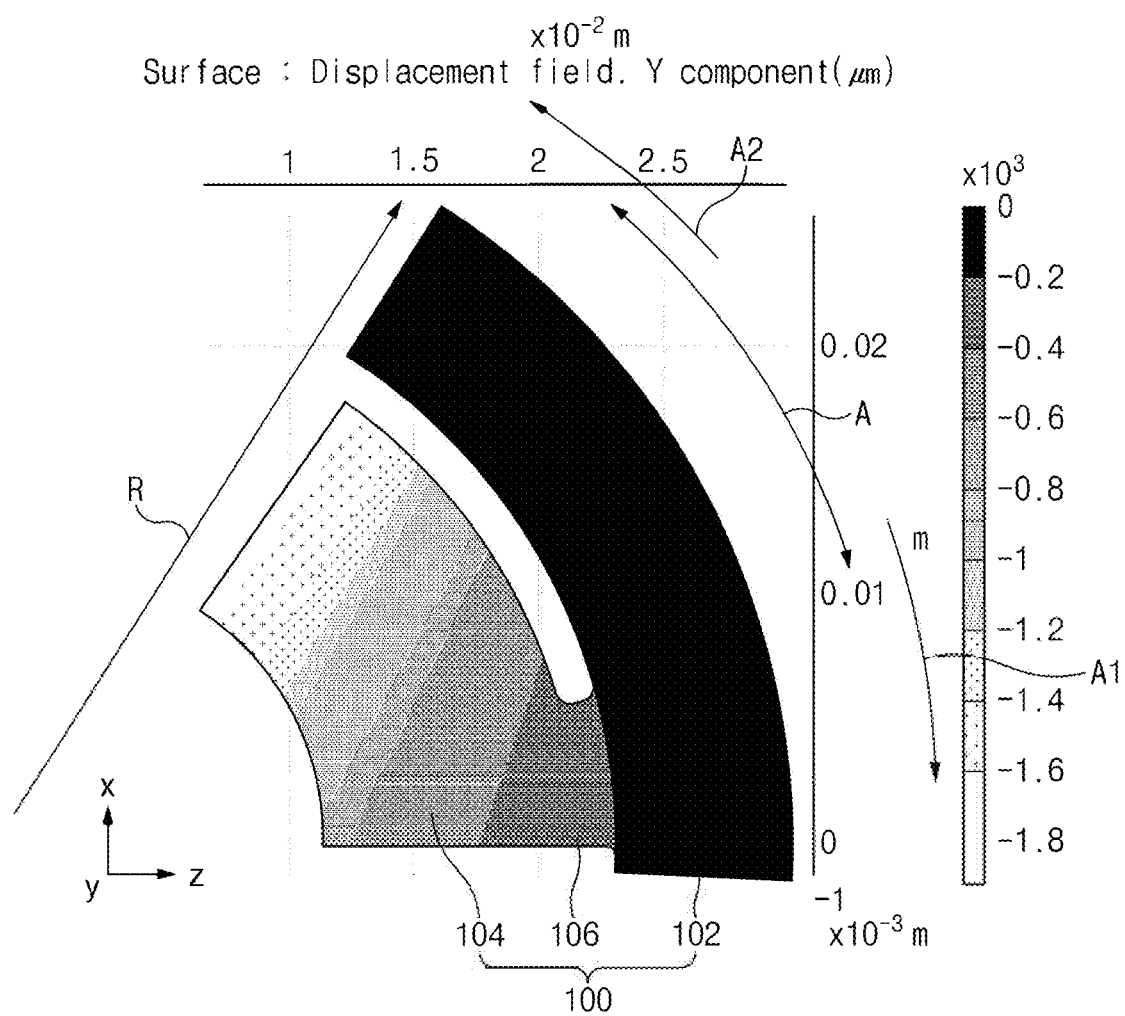
FIG. 5 is a view illustrating amounts of deformation of a circumferential region, a separate region, and a connection region when the air foil bearing is deformed.
Figure 6:
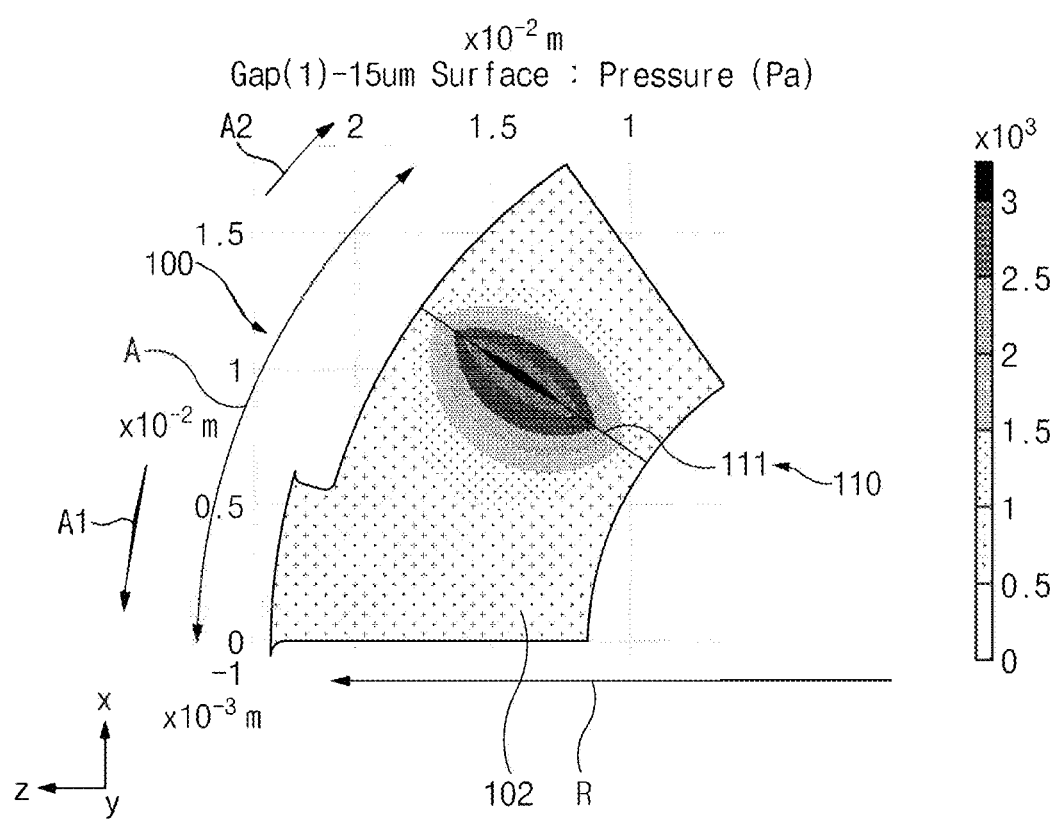
FIG. 6 is a view illustrating an example of a stepped portion provided in a bearing plate of the air foil bearing.
Figure 7:
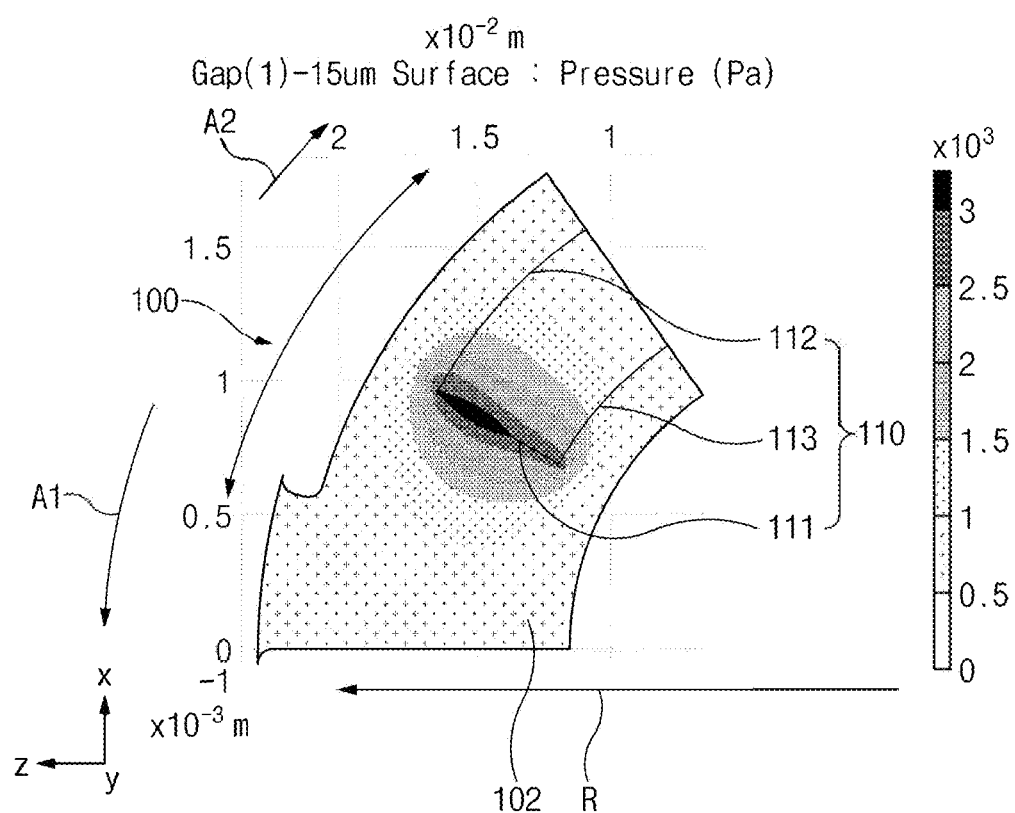
FIG. 7 is a view illustrating an example of the stepped portion provided in the bearing plate of the air foil bearing.
Figure 8:
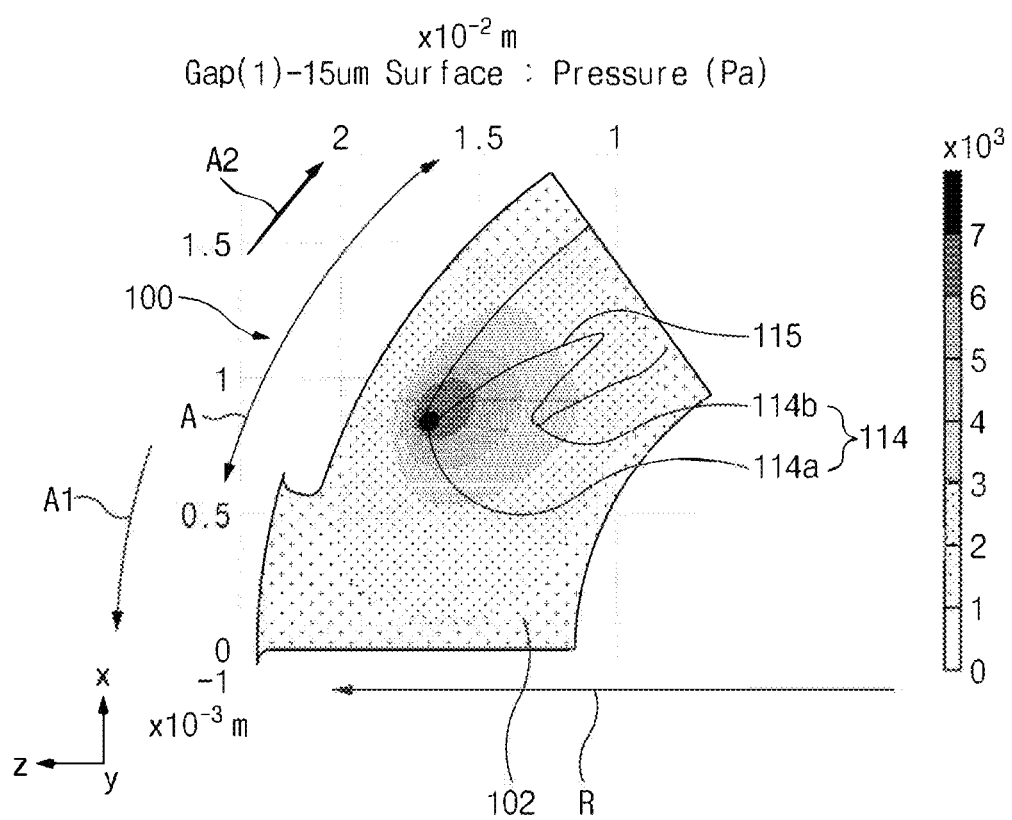
FIG. 8 is a view illustrating an example of the stepped portion provided in the bearing plate of the air foil bearing.

FIG. 1 is a plan view illustrating an air foil bearing, and FIG. 2 is an enlarged view illustrating one of a plurality of separate regions and a peripheral region thereof which are provided in the air foil bearing. FIG. 3 is a cross-sectional view illustrating a state before the air foil bearing is deformed, and FIG. 4 is a cross-sectional view illustrating a state in which the air foil bearing has been deformed. FIG. 5 is a view illustrating amounts of deformation of a circumferential region, a separate region, and a connection region when the air foil bearing is deformed, and FIG. 6 is a view illustrating a first example of a stepped portion provided in a bearing plate of the air foil bearing. FIG. 7 is a view illustrating a second example of the stepped portion provided in the bearing plate of the air foil bearing, and FIG. 8 is a view illustrating a third example of the stepped portion provided in the bearing plate of the air foil bearing.

In some implementations, an air foil bearing 10 may include a bearing plate 100 having a plate shape. The bearing plate 100 may be spaced a certain distance from a rotary body (for example, a rotary unit 3 of a compressor as described later) which is provided independently of the air foil bearing 10. When the rotary body rotates, the flow of air (hereinafter, referred to as an 'air film') present in a space between the bearing plate 100 and the rotary body is formed, and accordingly, pressure distribution is generated. Thus, in some implementations, when the rotary body rotates, the pressure distribution of the air film described above may support the rotary body. In particular, unlike other types of bearings, the air foil bearing 10 may support the rotary body without direct contact with the rotary body.

As illustrated in FIG. 1 for instance, the bearing plate 100 may have a circular outer circumference and be divided into a plurality of regions. However, unlike that described above, the outer circumference of the bearing plate 100 may have polygonal shapes such as a triangular shape and a quadrangular shape other than a circular shape, and may have an irregular shape.

More specifically, the bearing plate 100 may include a circumferential region 102 that forms the circumference of the bearing plate 100 and extends in a circumferential direction A of the circle. More specifically, the circumferential region 102 may have a ring shape of which a central region is perforated.

In some implementations, the bearing plate 100 may further include a separate region 104 that is spaced inward from the circumferential region 102 in a radial direction R of the circle. The separate region 104 described above may be provided in plurality. More preferably, the plurality of separate regions 104 may be arranged at equidistant intervals in the circumferential direction A of the circle, and the plurality of separate regions 104 may have the same shape. For example, four to six separate regions 104 may be provided in the bearing plate 100. FIG. 1 illustrates a state in which six separate regions 104 are provided.

Continuing to refer to FIG. 1, the bearing plate 100 may include connection regions 106 that connects the circumferential region 102 to the separate regions 104. The number of the connection regions 106 may correspond to the number of the separate regions 104. For example, the connection regions 106 may correspond one-to-one to the separate regions 104.

In some implementations, the connection region 106 may connect one end of the separate region 104 in the circumferential direction A to the circumferential region 102. More specifically, as illustrated in FIG. 1, each of the plurality of connection regions 106 provided in the bearing plate 100 may connect the circumferential region 102 to one end in a first circumferential direction A1 among both ends of each of the plurality of separate regions 104 in two circumferential directions A. For example, as illustrated in FIG. 1, when the first circumferential direction A1 is the counterclockwise direction, each of the plurality of separate regions 104 provided in the bearing plate 100 may extend from the connection regions 106 in the clockwise direction (that is, a second circumferential direction A2 opposite to the first circumferential direction A1).

In some examples, the width of the separate region 104 in the circumferential direction A may be greater than the width of the connection region 106 in the circumferential direction A. Therefore, a certain empty space may be formed between the circumferential region 102 and the separate region 104. As will be described later, the circumferential region 102 may be a fixed end region that is fixed to one component, and the separate region 104 may be a free end region that may not be fixed to one component but deformable. Therefore, when no force acts on the bearing plate 100, the bearing plate 100 maintains an undeformed state as illustrated in FIG. 3. Then, when a force acts on the bearing plate 100, for example, when pressure distribution is formed, in an air film between the bearing plate 100 and the rotary unit 3, by the rotation of the rotary unit 3, the circumferential region 102 fixed to the one component maintains an undeformed state, but the separate region 104 is deformed by the pressure distribution of the air film as illustrated in FIG. 4. More specifically, an amount of deformation of the separate region 104 increases with distance from the connection region 106. In this case, the space between the bearing plate 100 and the rotary unit 3 has a wedge shape, and accordingly, the area in which the pressure distribution is generated also increases. Therefore, in some examples, as the area of the pressure distribution increases, more loads acting on the rotary unit 3 may be supported.

In some implementations, referring to FIGS. 3 and 4, the air foil bearing 10 may further include a material layer 200 coupled and fixed to the bearing plate 100 and made of a different material from the bearing plate 100.

The material layer 200 may be configured to reduce vibration and noise which are generated in the bearing plate 100 by disturbance in an operation environment of the air foil bearing 10. In order to achieve the above objective, in some implementations, the viscoelasticity of the material layer 200 may be greater than the viscoelasticity of the bearing plate 100. Thus, in some implementations, shearing strain may be generated inside the material layer 200 having relatively higher viscoelasticity in the operation environment of the air foil bearing 10, and accordingly, the material layer 200 may absorb the vibration and noise that are generated in the bearing plate 100 described above.

In some implementations, the bearing plate 100 may include a metal material. In one example, the bearing plate 100 may include stainless steel, and the material layer 200 may include epoxy resin. (i) The epoxy resin has excellent heat resistance, and thus, there is little risk of damage to the material layer 200 even when the bearing plate 100 is used under a high temperature environment. (ii) The thickness and shape of the material layer 200 can be freely, designed because precision molding thereof is possible due to a low degree of shape deformation caused by curing in the manufacturing process of the epoxy resin. (iii) The epoxy resin has excellent durability due to low deformation caused by torsion, etc., and thus can make a contribution to overall improvement in durability of the air foil bearing 10. However, the material of the material layer 200 is not limited to the epoxy resin, and various materials may be used for the material layer 200 as long as they have higher viscoelasticity than the bearing plate 100.

More specifically, the material layer 200 may be in close contact with and fixed to the lower surface of the bearing plate 100. Referring to FIGS. 3 and 4 in which the air foil bearing 10 is used, this can be understood as follows. When the surface of the bearing plate 100 that faces the rotary unit 3 with the air film therebetween is defined as the upper surface of the bearing plate 100, the material layer 200 may be in close contact with and fixed to the lower surface of the bearing plate 100 on the opposite side from the upper surface. This may be understood as a method for preventing the material layer 200 from being directly exposed to the pressure distribution formed by the air, and thus, it is possible to prevent the material layer 200 from being damaged.

Continuing to refer to FIGS. 3 and 4, the air foil bearing 10 may further include a lower reinforcing member 300 that is in close contact with and fixed to the lower surface of the material layer 200. The lower reinforcing member 300 may be configured to minimize exposure of the material layer 200 to the outside, thereby preventing the material layer 200 from being damaged.

The feature, in which the lower reinforcing member 300 is in close contact with and fixed to the lower surface of the material layer 200, may be understood as that the bearing plate 100 and the lower reinforcing member 300 face each other with the material layer 200 therebetween. The lower reinforcing member 300 may include stainless steel. When both the bearing plate 100 and the lower reinforcing member 300 include stainless steel, the bearing plate 100 and the lower reinforcing member 300 may have the same grade of stainless steel. For example, the bearing plate 100 and the lower reinforcing member 300 may include SUS 304, but the types of the stainless steel are not limited to SUS 304.

In some implementations, in the use environment of the air foil bearing 10 as will be described later, one side of the bearing plate 100 is fixed, but the other side of the bearing plate 100 is movable. That is, the one side of the bearing plate 100 may be a fixed end region, and the other side of the bearing plate 100 may be a free end region. More specifically, the circumferential region 102 and the connection region 106 may be the fixed end regions, and the separate region 104 may be the free end region. Therefore, as illustrated in FIG. 5, when the air foil bearing 10 is deformed, the fixed end regions, i.e., the circumferential region 102 and the connection region 106 may not bend, but the fixed end region, i.e., the separate region 104 bends. In particular, a portion of the separate region 104 that is further away from the connection region 106 has a greater degree of bending.

Thus, the noise and vibration generated in the bearing plate 100 during the use of the air foil bearing 10 are mainly generated in the free end region. Accordingly, in order to eliminate the noise and vibration generated in the free end region, the material layer 200 needs to be in close contact with and fixed to the free end region.

On the basis of the above descriptions, the material layer 200 may be in close contact with and fixed to the lower surface of the separate region 104 that is the free end region, and may be spaced apart from the lower surfaces of the circumferential region 102 and the connection region 106 in the radial direction R. This can be understood as that the material layer 200 may not be provided on the lower surface of the circumferential region 102. However, unlike that described above, the material layer 200 may be in close contact with and fixed to the lower surfaces of the circumferential region 102 and the connection region 106. In some implementations, as described above, the lower reinforcing member 300 may be in close contact with and fixed to the lower surface of the material layer 200. Therefore, the region of the air foil bearing 10, in which the lower reinforcing member 300 is provided, may correspond to the region in which the material layer 200 is provided.

Continuing to refer to FIGS. 3 and 4, the bearing plate 100 of the air foil bearing 10 may further include a stepped portion 110 that is formed on the upper surface of the bearing plate 100 and has a stepped shape, and the thickness of the bearing plate 100 may be changed at the stepped portion 110.

According to the present disclosure, the distance between the bearing plate 100 and the rotary unit 3, that is, the width of the air film is changed in a region in which the stepped portion 110 is formed. In this case, when the rotary unit 3 starts to rotate in the use environment of the air foil bearing 10, appropriate pressure distribution may be formed in the air film. Accordingly, the free end region of the bearing plate 100, that is, the separate region 104 may be bent in a direction away from the air film. That is, the stepped portion 110 may be configured to form the appropriate pressure distribution in the air film during the initial rotation of the rotary unit 3, and thus, the free end region of the bearing plate 100 is bent, and the air film has a certain wedge shape.

In one example, the stepped portion 110 may be formed through an etching process. That is, the stepped portion 110 may be formed by spraying a chemical solution or gas on the surface of the bearing plate 100.

The stepped portion 110 describe above may be formed in the separate region 104 that is the free end region. This is intended so that the pressure distribution of the air film can be formed in a region of the air film near the separate region 104, and thus, the separate region 104 may be effectively bent.

When the stepped portion 110 is described in more detail, the thickness of a portion of the separate region 104, which is spaced apart from the connection region 106 on the basis of the stepped portion 110, may be less than the thickness of a portion of the separate region 104, which is adjacent to the connection region 106 on the basis of the stepped portion 110. This may be intended so that the thickness of the air film in a region adjacent to the connection region 106 on the basis of the stepped portion 110 is less than the thickness of the air film in a region spaced part from the connection region 106 on the basis of the stepped portion 110. Therefore, the pressure distribution of the air film is formed in the vicinity of the stepped portion 110.

Hereinafter, various shapes of the stepped portion 110 will be described with reference to FIGS. 6 to 8.

Referring to FIG. 6, a stepped portion 110 may include a first stepped portion 111 that extends in a direction crossing a circumferential direction A. More preferably, the first stepped portion 111 may extend in a direction parallel to a radial direction R. FIG. 6 illustrates, as a first example of the present disclosure, a state in which the first stepped portion 111 extends from an outer end of the separate region 104 located outside in the radial direction R to an inner end of the separate region 104 located inside in the radial direction R.

In some implementations, with reference to FIG. 7, in addition to a first stepped portion 111 that extends in a direction crossing a circumferential direction A, a stepped portion 110 may further include a second stepped portion 112 that extends from an outer end of the first stepped portion 111 which is located outside in a radial direction R, and the second stepped portion 112 extends in a direction crossing the radial direction R.

In some examples, the stepped portion 110 may further include a third stepped portion 113 that extends from an inner end of the first stepped portion 111 which is located inside in the radial direction R, and the third stepped portion 113 extends in a direction crossing the radial direction R. This may be understood as that the stepped portion 110 has overall a U-shape when a bearing plate 100 is viewed from above. More preferably, in the second example of the present disclosure, the second stepped portion 112 and the third stepped portion 113 may extend in a direction parallel to the circumferential direction A.

More specifically, in some examples, the first stepped portion 111 may connect one of both ends of the second stepped portion 112 in the circumferential direction A, which is adjacent to the connection region 106, to one of both ends of the third stepped portion 113 in the circumferential direction A, which is adjacent to the connection region 106.

In addition, according to a third example of the present disclosure with reference to FIG. 8, a stepped portion 110 may include a protrusion section 114, which protrudes toward a connection region 106, and a recess section 115, which is connected to one end of the protrusion section 114 and recessed in a direction away from the connection region 106. More specifically, the protrusion section 114 and the recess section 115 may be spaced apart from each other in a radial direction R. This may be understood as that the stepped portion 110 has approximately a wave shape in the radial direction R.

Continuing to refer to FIG. 8, the protrusion section 114 may include a first protrusion section 114a, which is connected to an outer end of the recess section 115 located outside in the radial direction R, and a second protrusion section 114b, which is connected to an inner end of the recess section 115 located inside in the radial direction R. In one example, FIG. 8 illustrates a state in which the width of the first protrusion section 114a in a circumferential direction A is greater than the width of the second protrusion section 114b in the circumferential direction A. The distance between the first protrusion section 114a and the connection region 106 in the circumferential direction A is less than the distance between the second protrusion section 114b and the connection region 106 in the circumferential direction A.

Hereinafter, a compressor 1 will be described on the basis of the above descriptions of the air foil bearing 10.

Figure 9:
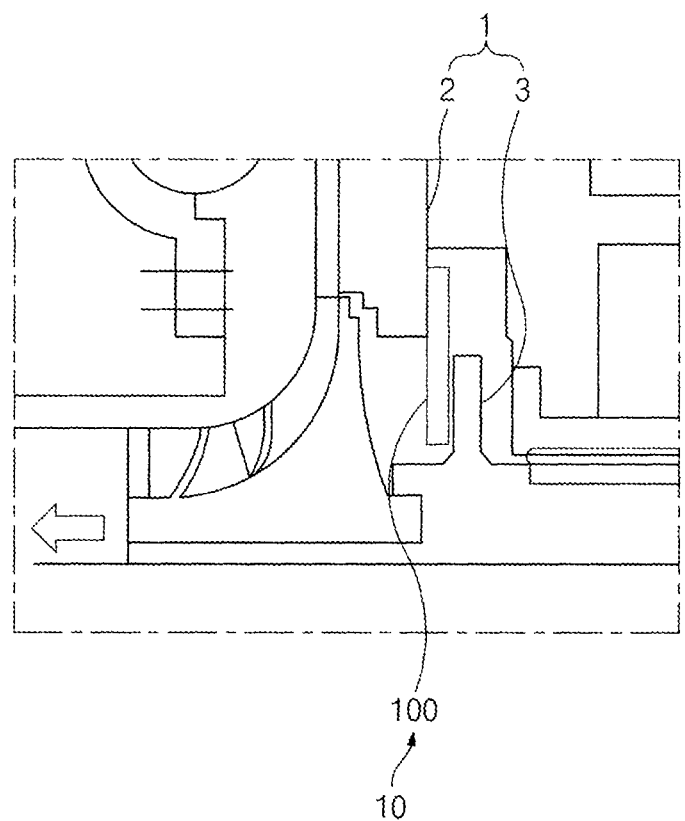
FIG. 9 is a cross-sectional view illustrating an example of a compressor to which an air foil bearing is mounted.

FIG. 9 is a cross-sectional view illustrating a compressor to which an air foil bearing is mounted.

The compressor 1 may include a housing 2, an air foil bearing 10 fixed to one surface of the housing 2, and a rotary unit 3 spaced apart from the air foil bearing 10 and rotatable relative to the housing 2.

As described above, the air foil bearing 10 may include a bearing plate 100 having a plate shape and a material layer 200 coupled and fixed to the bearing plate 100 and made of a different material from the bearing plate 100 (see FIGS. 1 to 8). Here, the viscoelasticity of the material layer 200 may be greater than the viscoelasticity of the bearing plate 100.

In some implementations, the bearing plate 100 may include a fixed end region, which is fixed to the housing 2, and a free end region, which is spaced apart from the housing 2 and provided movably relative to the housing 2. That is, referring to FIG. 9, the fixed end region described above may face the housing 2, but the free end region described above may be spaced apart from the housing 2 in a direction toward the rotary unit 3. In this case, the free end region is exposed to an empty space inside the compressor 1. Thus, this case may have higher cooling efficiency than a case in which a free end region faces the housing 2.

In some implementations, as described above, the outer circumference of the bearing plate 100 has the shape of a circle. The bearing plate 100 includes a circumferential region 102, which forms the circumference of the bearing plate 100 and extends in a circumferential direction A of the circle, a separate region 104, which is spaced inward from the circumferential region 102 in a radial direction R of the circle; and a connection region 106, which connects the circumferential region 102 to the separate region 104. Here, the circumferential region 102 may be the fixed end region described above, and the separate region 104 may be the free end region described above. More specifically, the separate region 104 may face the rotary unit 3, and the air film described above may be formed in a space between the separate region 104 and the rotary unit 3. Here, the up-down direction in each of FIGS. 3 and 4 may correspond to the left-right direction in FIG. 9.

According to the present disclosure, the air foil bearing, which reduces vibration and noise caused by disturbance while having a simpler structure than in the related art, and the equipment, to which the air foil bearing is mounted, may be provided.

Although the present disclosure has been described with specific exemplary implementations and drawings, the present disclosure is not limited thereto, and it is obvious that various changes and modifications may be made by a person skilled in the art to which the present disclosure pertains within the technical idea of the present disclosure and equivalent scope of the appended claims.

What is claimed is:

1. An air foil bearing comprising:
   a bearing plate that has a circular shape; and
   a material layer fixed to the bearing plate,
   wherein the bearing plate and the material layer are made of different materials from each other such that a viscoelasticity of the material layer is greater than a viscoelasticity of the bearing plate,
   wherein the bearing plate comprises:
      a circumferential region that defines a circumference of the bearing plate and extends in a circumferential direction,
      a separate region that is spaced inward from the circumferential region in a radial direction, and
      a connection region that connects the circumferential region to the separate region,
   wherein the bearing plate defines a stepped portion at an upper surface of the bearing plate such that a thickness of the bearing plate changes at the stepped portion, the stepped portion being defined at the separate region,
   wherein the separate region has:
      a first portion that is spaced apart from the connection region and defines a first thickness of the separate region, and
      a second portion that is disposed adjacent to the connection region and defines a second thickness of the separate region, and
   wherein the first thickness is less than the second thickness and greater than the thickness of the bearing plate at the stepped portion.

2. The air foil bearing of claim 1, wherein the material layer is in contact with and fixed to a lower surface of the bearing plate, the lower surface being opposite to the upper surface of the bearing plate.

3. The air foil bearing of claim 1, wherein a circumferential width of the separate region in the circumferential direction is greater than a circumferential width of the connection region in the circumferential direction.

4. The air foil bearing of claim 1, wherein the material layer is in contact with and fixed to a lower surface of the separate region and is spaced apart from a lower surface of the circumferential region in the radial direction, and
   wherein the lower surfaces of the separate region and the circumferential region are opposite to the upper surface of the bearing plate.

5. The air foil bearing of claim 1, further comprising a lower reinforcing member that is in contact with and fixed to a lower surface of the material layer, the lower surface of the material layer facing away from the bearing plate.

6. The air foil bearing of claim 5, wherein the bearing plate and the lower reinforcing member comprise stainless steel, and the material layer comprises epoxy resin.

7. The air foil bearing of claim 1, wherein the stepped portion comprises a first stepped portion that extends in a direction crossing the circumferential direction.

8. The air foil bearing of claim 7, wherein the stepped portion further comprises a second stepped portion that extends from an outer end of the first stepped portion and that is located outside the first stepped portion in the radial direction, and
   wherein the second stepped portion extends in a direction crossing the radial direction.

9. The air foil bearing of claim 8, wherein the stepped portion further comprises a third stepped portion that extends from an inner end of the first stepped portion and that is located inside the first stepped portion in the radial direction, and
   wherein the third stepped portion extends in a direction crossing the radial direction.

10. The air foil bearing of claim 9, wherein the first stepped portion connects (i) an end of the second stepped portion disposed adjacent to the connection region to (ii) an end of the third stepped portion disposed adjacent to the connection region.

11. The air foil bearing of claim 1, wherein the stepped portion comprises:
   a protrusion section that extends toward the connection region; and
   a recess section that is connected to an end of the protrusion section and extends in a direction away from the connection region.

12. The air foil bearing of claim 11, wherein the protrusion section comprises:
   a first protrusion section connected to an outer end of the recessed section and located outside the recessed section in the radial direction; and
   a second protrusion section connected to an inner end of the recessed section and located inside the recessed section in the radial direction, and
   wherein a width of the first protrusion section in the circumferential direction is greater than a width of the second protrusion section in the circumferential direction.

13. The air foil bearing of claim 12, wherein a distance between the first protrusion section and the connection region is less than a distance between the second protrusion section and the connection region.

14. A compressor comprising:
   a housing; and
   an air foil bearing fixed to a surface of the housing,
   wherein the air foil bearing comprises:

a bearing plate that has a circular shape, and
a material layer fixed to the bearing plate,
wherein the bearing plate and the material layer are made of different materials from each other such that a viscoelasticity of the material layer is greater than a viscoelasticity of the bearing plate,
wherein the bearing plate comprises:
a fixed end region that is fixed to the housing, and
a free end region that is spaced apart from the housing and moves relative to the housing,
wherein the bearing plate comprises:
a circumferential region that defines a circumference of the bearing plate and extends in a circumferential direction,
a separate region that is spaced inward from the circumferential region in a radial direction, and
a connection region that connects the circumferential region to the separate region,
wherein the bearing plate defines a stepped portion at an upper surface of the bearing plate such that a thickness of the bearing plate changes at the stepped portion, the stepped portion being defined at the separate region,
wherein the separate region has:
a first portion that is spaced apart from the connection region and defines a first thickness of the separate region, and
a second portion that is disposed adjacent to the connection region and defines a second thickness of the separate region, and
wherein the first thickness is less than the second thickness and greater than the thickness of the bearing plate at the stepped portion.

* * * * *